Patented June 1, 1943

2,320,577

UNITED STATES PATENT OFFICE 2,320,577

GEOCHEMICAL PROSPECTING

Thomas H. Dunn, Tulsa, Okla., assignor to Stanolind Oil and Gas Company, Tulsa, Okla., a corporation of Delaware No Drawing. Application February 9, 1940, Serial No. 318,193

8 Claims. (Cl. 23—230)

This invention relates to geochemical prospecting, and more particularly to a method of geochemical prospecting involving the sampling of soils and the determination in surface soils of waxes, the occurrence of which has been found to be correlatable with the presence of deep-seated petroleum deposits.

It has been found that the presence of deep-seated oil and/or gas deposits is often accompanied by the presence in the soil, above the deep-seated deposits and in the same general location, of relatively minute quantities of certain waxes which are of substantially hydrocarbon constitution, but which may contain small quantities of elements other than hydrogen and carbon, notably oxygen. The precise chemical structure of these waxes has not been determined and their composition is not entirely constant. They can, however, be readily identified. These waxes are not normally visible in the soil but can be extracted from it as will hereinafter appear. They are solid at room temperature but melt below 200° F. They vary in color from a slightly yellowish white to a dark yellow. Soil waxes are readily soluble in solvents such as benzol, carbon tetrachloride, pentane and hexane. In general they qualitatively resemble paraffin wax and ozocerite. Soil waxes are also generally similar to paraffin wax and ozocerite so far as their solubility in various solvents is concerned.

One theory concerning the presence of these waxes in surface soils in the vicinity of deep-seated petroleum deposits is that they are formed by polymerization and/or oxidation of light hydrocarbons which have migrated from the deep-seated petroleum deposits. This conversion is apparently influenced by light and air and this is believed to account for the presence of these waxes in the surface soils. I am, however, not limited to this theory, since regardless of the correct explanation of the phenomenon, the fact remains that such soil waxes appear to be associated with the deep-seated petroleum deposits and therefore constitute a valuable prospecting tool.

It is an object of this invention to provide means and methods of geochemical prospecting, by determining in new and advantageous manners the presence and amount of these soil waxes. Other and more detailed objects, advantages, and uses of my invention will become apparent as the description thereof proceeds.

In practicing my invention a sample of the surface soil is taken at a depth of, preferably, a few inches below the actual surface, and is wrapped or otherwise enclosed to prevent contamination. This sample is then transported to a laboratory, or it can be analyzed on the spot, to determine the amount of soil waxes, if any, contained therein.

This determination is made by extracting the sample of soil with a suitable solvent for the soil waxes. Various volatile organic solvents can be used but I find it particularly advantageous to use hydrocarbon solvents because of their selective solvent power for the soil waxes. Such hydrocarbon solvents may range, for example, from the liquefied, normally gaseous hydrocarbons, such as propane and butane, through the light and heavy naphthas, and even up to such relatively non-volatile solvents as kerosene. While a broad range of hydrocarbon solvents can thus be used, I find it greatly preferable to use a hydrocarbon solvent having a volatility not greater than that of butane and not less than that of octane.

Lighter hydrocarbon solvents, for instance propane, are disadvantageous, first in that they are too volatile to be handled with any ease and convenience, and second in that the waxes are less soluble in these very light hydrocarbons than in those of somewhat higher molecular weight and lower volatility. On the other hand, the high boiling petroleum solvents are disadvantageous, since they usually contain contaminants which are likely to interfere with the determination of the soil wax content, and further in that they do not have sufficient volatility to permit their ready removal from the soil waxes.

Of these various hydrocarbon solvents, I prefer to use pentane, which I find has sufficient solvent power to permit assurance that the soil waxes are completely dissolved, which has a sufficiently low volatility to make it easy to handle, sufficiently high volatility to permit its complete and facile removal from the hydrocarbon wax, and which can readily be obtained in a practically 100% pure condition. As a second choice I find hexane to have much these same virtues.

In accordance with my invention, pentane, or an alternative solvent, is contacted with the sample of soil to be analyzed, the solvent containing dissolved soil waxes, if any, is filtered to remove insoluble material, and the soil waxes are then obtained by evaporating the solvent and weighing the residue.

It has been found that high soil wax contents are associated with deep-seated petroleum deposits, and thus by analyzing soils obtained at various locations along a given survey line, or over a given area, indications of considerable value can be obtained concerning the presence of petroleum deposits in the underlying geological formations. Thus, for instance, samples of surface soil can be taken at a suitable depth, for instance a few inches below the surface or immediately below the surface loam at each of a series of survey stations located at desired intervals, for instance every one-tenth mile along a survey line or spaced over a survey area. Each of these soil samples can then be analyzed by the method set out in this specification to determine the relatie amounts of soil waxes in the soil samples taken from the various survey stations or, in other words, from various points horizontally spaced over the terrain to be surveyed. The data thus obtained can be used to prepare a map or contour showing the variation in soil wax content over a terrain or similar results can be obtained by merely comparing these data. So-called anomalies or abnormally high values of soil wax content are indicative of the presence or possible presence of deep-seated petroleum deposits although such deposits may not be located immediately below the survey stations giving the highest values but rather below and slightly offset from these survey stations.

As a more specific example of a method of practicing my invention, the soil wax content of a soil sample can be determined by the Soxhlet extraction method, using pentane as the solvent, and maintaining a condenser temperature of approximately 40° F. In this procedure an 80 gram sample is weighed into the Soxhlet thimble and extracted with pentane for four hours. The solvent in the flask used in the Soxhlet procedure is evaporated to a volume of from about 10 to about 15 c. c., and is then transferred to a weighed porcelain crucible. The flask is rinsed several times with small volumes of fresh pentane, to insure removal of all wax from the flask to the crucible. The pentane in the crucible is then evaporated slowly, for instance on a water bath. After dryness is reached the crucible is allowed to remain on the water bath for about 30 minutes, while subjected to steam rising from boiling water in the water bath. Following this drying operation, the crucible is placed in a desiccator until cooled, and is then weighed. The increase in weight represents the weight of wax in the sample undergoing analysis.

If the soil sample which is being analyzed is damp, or contains any substantial amount of water, it is highly desirable to dry it prior to the extraction with pentane, for instance by pulverizing it and drying it in air or by heating it in an oven at a temperature slightly in excess of the boiling point of water, for instance 220° F.

While the Soxhlet extraction method above outlined is well suited to determination of soil wax content, a more rapid and convenient method has been found to check closely with the Soxhlet method. In this more rapid procedure an 80 gram soil sample, previously powdered and dried, is introduced into an 250 c. c. Erlenmeyer flask. Pentane is then added in the amount of 180 c. c., the soil and pentane are agitated gently, the flask is stoppered and allowed to stand for at least four hours, or over night. The height of the liquid level in the flask is marked with a gummed label, or otherwise.

After standing for the time indicated, the flask is observed to determine whether or not there has been any loss of pentane, and if there has, the liquid level is restored by the addition of fresh pentane. The next operation is to decant most of the liquid into a clean graduate and read its volume immediately. This should be approximately 140 c. c. This liquid is then filtered through a filter paper, such as a clean No. 40 Whatman paper, into a clean 250 c. c. beaker. The pentane is then evaporated, for instance over a hot water bath. Alternatively, it may be evaporated by allowing the beaker to stand over night while covered by a watch glass to exclude dust. The residue, after evaporation, is taken up with 10 to 15 c. c. portions of pentane, and is transferred to a clean, weighed porcelain crucible. The beaker is rinsed at least three times with pentane, to insure removal of all wax to the crucible. The pentane in the crucible is then evaporated slowly until nearly to dryness. This is most conveniently done over a hot water bath. After dryness is reached the crucible is allowed to remain on the water bath for about 30 minutes, while subjected to steam rising from boiling water in the bath. Following this operation, the crucible is placed in a desiccator until cool, and is then weighed. The weight of wax recovered in the crucible represents the wax in the solvent measured in the graduate, and the quantity of wax in the total volume of solvent that was added to the soil is calculated by multiplying the determined amount of wax by the fraction the numerator of which is the amount of pentane originally added, and the denominator of which is the amount of pentane measured in the graduate. The figure thus corrected represents the weight of wax in the sample of soil taken for analysis.

Having made such determinations for each of a series of samples taken from spaced survey stations, the results can, as previously described, be mapped or compared as a guide to the presence (or possible presence) and location of deep-seated petroleum deposits located far below the surface soils from which the soil waxes were obtained.

This is a continuation-in-part of my copending application Serial Number 220,712, filed July 22, 1938.

While I have described my invention in connection with certain preferred embodiments thereof, it is to be understood that these are by way of illustration, and not by way of limitation, and I do not mean to be restricted thereby, but only to the scope of the appended claims.

I claim:

1. A method of geochemical prospecting comprising taking samples of soil at horizontally spaced points near the surface, extracting each of said samples with a solvent of the hydrocarbon type to dissolve soil waxes, separating insoluble material from the solution thus formed, removing said solvent by evaporation, weighing the soil waxes remaining after the evaporation step, whereby valuable information is obtained concerning the location of underground hydrocarbon deposits.

2. A method of geochemical prospecting comprising taking samples of soil at horizontally spaced points near the surface, extracting each of said samples with a measured volume of a selective solvent for soil waxes, replacing accurately any solvent lost by evaporation during the extraction step, decanting the bulk of the solution thus formed, measuring the volume of the solution thus decanted, filtering the decanted solution, evaporating the filtered solution, weighing the wax remaining after evaporation, and correcting the determined wax content by a factor the numerator of which is the first-mentioned measured volume and the denominator of which is the second-mentioned measured volume, thereby obtaining comparative data on soil wax contents of the soils taken from said horizontally spaced points, said comparative data constituting an indication of the presence or possible presence of deep-seated petroleum deposits.

3. A method according to claim 2 in which said selective solvent is hydrocarbon in nature and has a volatility not greater than that of butane and not less than that of octane.

4. In the art of exploration for underground hydrocarbon deposits, the steps which comprise systematically collecting a series of samples of surface soil at spaced locations, extracting said samples separately with an organic solvent for solid, petroleum-derived constituents present initially in said samples in soluble form, evaporating said organic solvent from each of said extracts, and weighing the residual solid, petroleum-derived constituents, whereby valuable information is obtained concerning the location of said underground hydrocarbon deposits.

5. In the art of exploration for underground hydrocarbon deposits, the steps which comprise systematically collecting a series of samples of surface soil at spaced locations, extracting said samples separately with a solvent for solid, petroleum-derived constituents present initially in said samples in soluble form, said solvent being a volatile hydrocarbon, evaporating said solvent from each of said extracts, and weighing the residual solid, petroleum-derived constituents, whereby valuable information is obtained concerning the location of said underground hydrocarbon deposits.

6. A method as claimed in claim 5 wherein the volatile hydrocarbon solvent has a volatility not greater than that of butane and not less than that of octane.

7. A method as claimed in claim 5 wherein the volatile hydrocarbon solvent is pentane.

8. A method as claimed in claim 5 wherein the volatile hydrocarbon solvent is hexane.

THOMAS H. DUNN.